United States Patent [19]
Schwarz

[11] 3,912,027
[45] Oct. 14, 1975

[54] PRICE-INDICATING SCALE

[75] Inventor: Josef Schwarz, Balingen, Germany

[73] Assignee: Bizerba-Werke Wilhelm Kraut KG, Balingen, Germany

[22] Filed: Jan. 16, 1975

[21] Appl. No.: 541,407

[30] Foreign Application Priority Data
Jan. 17, 1974 Germany............................ 2402108

[52] U.S. Cl.................................. 177/40; 177/178
[51] Int. Cl.² ................. G01G 23/22; G01G 23/32
[58] Field of Search ................. 177/25, 40, 44, 178; 235/58 PS, 61 PS

[56] References Cited
UNITED STATES PATENTS

| | | | |
|---|---|---|---|
| 3,181,633 | 5/1965 | Worst .................................. | 177/44 |
| 3,489,233 | 1/1970 | Schwarz............................. | 177/178 |
| 3,497,381 | 2/1970 | Teraoka............................. | 177/178 |

FOREIGN PATENTS OR APPLICATIONS

| | | | |
|---|---|---|---|
| 965,079 | 5/1957 | Germany ............................ | 177/178 |

Primary Examiner—George H. Miller, Jr.
Attorney, Agent, or Firm—Michael S. Striker

[57] ABSTRACT

A frame has a first portion turnable about a turning axis, and a second portion mounted for straight-line movement. An optical price-indicating system of the scale includes a translucent dial having a plurality of price scales and movable in dependence upon a weight on the scale. An objective is provided at one and a light source at the other side of the dial, and the objective is mounted on the second portion of the frame and has an optical axis parallel to the turning axis. A stationary projecting screen is provided, and a pair of mirrors are also provided, being respectively mounted on the first and second portions for directing a light beam from the objective onto the screen. The mirrors are telescopically shiftable relative to one another in the direction in which the light beam travels from one to the other of the mirrors, and one of the mirrors is mounted on the optical axis and the other mirror is mounted on the turning axis.

7 Claims, 1 Drawing Figure

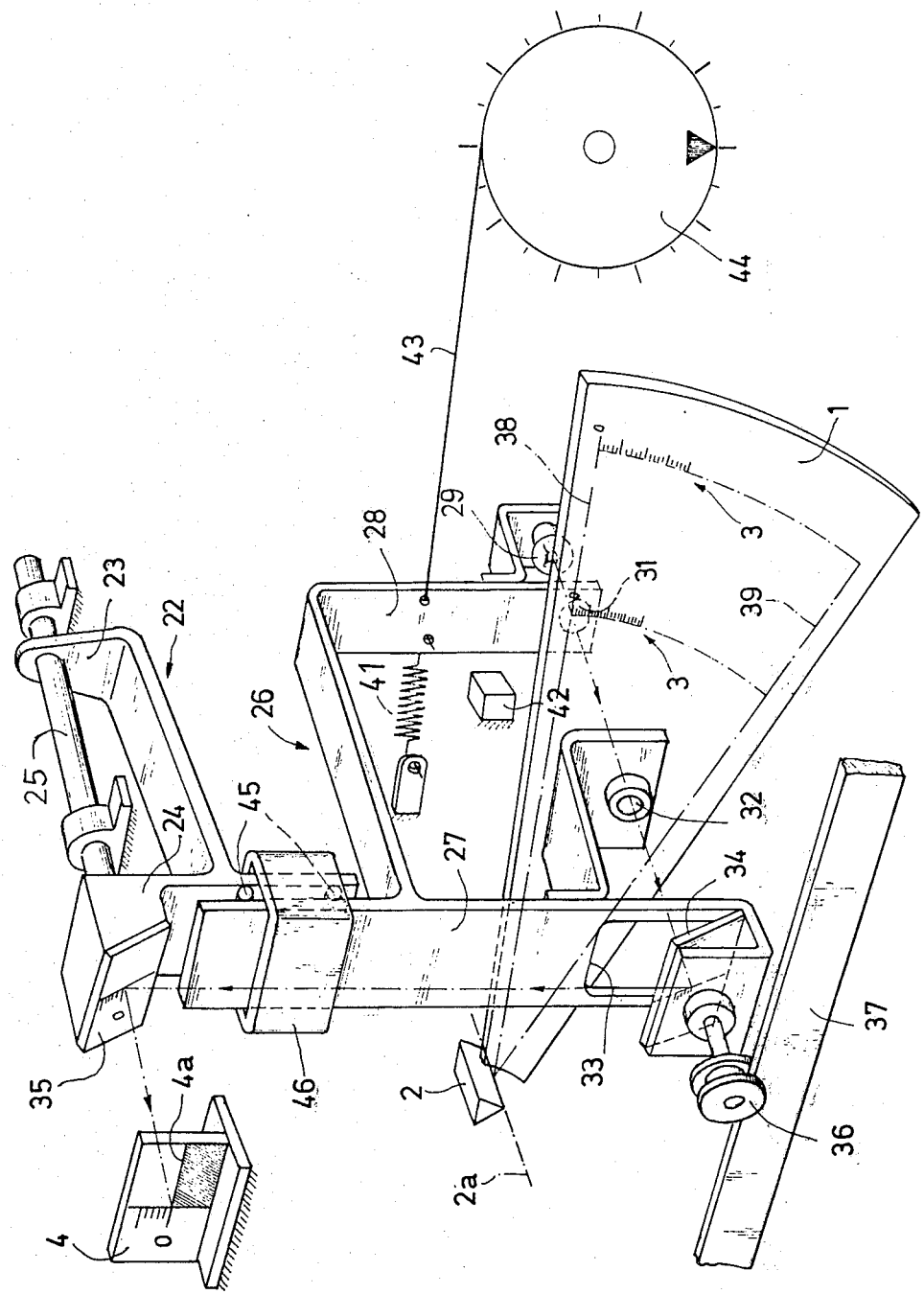

PRICE-INDICATING SCALE

BACKGROUND OF THE INVENTION

The present invention relates generally to a scale, and more particularly to a price-indicating scale. Still more particularly, the invention relates to a price-indicating scale having an optical price-indicating system.

It is known to provide price-indicating scales in which the price of an item placed onto the scale for weighing purposes is computed and projected onto a screen. For this purpose these so-called projecting scales are provided with an optical reproducing system which utilizes a lamp, a condenser, a transparent dial provided with price scales, an objective and a screen, such as a ground-glass screen. The dial is movable, for example turnable, in dependence upon the weight of an object placed onto the scale. Depending upon the position of the dial a certain portion of one of the price scales on the dial is projected onto the screen, thus indicating the weight and the price of the weight. It is also known to provide scales of this type wherein only the weight is so indicated, but not the price. In the scales which do indicate the price in addition to the weight, it is known to provide on the movable dial a plurality of price scales each of which is associated with a certain base price of a particular type of goods, for example a certain price per unit weight. In order to assure that a scale corresponding to a certain base price is projected, the optical reproducing system is mounted displaceable with reference to the dial, so that the particular price scale to be reproduced on the screen is selectable. However, the displacement of the reproducing system has the disadvantage that the light paths have different lengths during different positions of the reproducing system, so that the image that is reproduced on the screen may be of different sizes from case to case, may be blurred or may be otherwise imperfect or difficult to read.

Attempts have been made to overcome this problem in the prior art, using beam-directing mirrors which are movable in mutually opposite directions. However, these prior-art constructions are quite complicated and are therefore expensive, aside from the fact that due to their complexity they are also highly susceptible to malfunctions.

Other types of approaches known from the prior art are such that they require specially constructed dials having the price scales provided thereon, and being of such construction that they are extremely difficult to produce and are therefore very expensive.

SUMMARY OF THE INVENTION

Accordingly, it is an object of this invention to overcome the disadvantages of the prior art.

More particularly, it is an object of the invention to provide an improved price-indicating scale which avoids the disadvantages outlined above with respect to the prior art.

Another ojbect of the invention is to provide such a price-indicating scale in which the arrangement of the price scales on the movable dial of the scale is considerably less complicated than in the prior art.

In keeping with these objects, and with others which will become apparent hereafter, one feature of the invention resides in a price-indicating scale comprising a frame having a first portion turnable about a turning axis, and a second portion mounted for straight-line movement. The scale further has an optical price-indicating system which comprises a translucent dial having a plurality of price scales and movable in dependence upon a weight in the scale, an objective at one and a light source at the other side of the dial. The objective is mounted on the second portion of the frame and has an optical axis parallel to the turning axis. A stationary projecting screen is provided, and a pair of mirrors are respectively mounted on the first and second portions for directing a light beam from the objective onto the screen. The mirrors are telescopically shiftable relative to one another in the direction in which the light beam travels from one to the other mirror, and one of the mirrors is mounted on the optical axis while the other mirror is mounted on the turning axis.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a somewhat diagrammatic illustration showing those portions of a price-indicating scale which are necessary for an understanding of the invention.

DESCRIPTION OF THE PREFERRED EMBODIMENTS

The drawing shows only those portions of a price-indicating scale which are necessary for an understanding of the present invention. All other portions which have been omitted are conventional and in keeping with what is known from the prior art.

The scale according to the present invention has a dial 1 which is firmly and rigidly connected in a known and non-illustrated manner with a balance arm (not shown) and with a knife edge balance 2. In dependence upon the weight of an object placed onto a support of the scale, the dial 1 is pivoted through a certain angle through the pivot axis 2a defined by the knife edge 2.

The dial 1 is of a translucent or transparent material, such as glass or synthetic plastic material. It is provided with a plurality of price scales 3 which are to be projected onto a screen 4, for example a ground glass screen, which is fixedly mounted in the scale and provided with an indicator mark 4a.

The projection of the scales 3 onto the screen 4 is effected via an optical reproducing system having a lamp 29 which together with a condenser lens 31 forms a light source, and an objective 32 into which a light beam from the light source is directed. There are further provided two beam-directing mirrors 34 and 35. These components are all mounted on a frame which is turnable about a fixed axis 25 that extends normal to the surface of the dial 1 and is formed by a shaft fixedly mounted in the (not illustrated) housing of the scale; the axis 25, if extended, passes through the center of the screen 4.

The frame on which the components of the optical producing system are mounted is composed of two portions, an upper portion 22 which has the shape of an inverted h, and a lower portion 26 having the form of an upright h. The upper portion 22 has two arms 23 and 24 which are turnably mounted on the shaft forming the axis 25, and the lower portion 26 has two arms 27 and 28. The dial 1 is located between the arms 27 and 28 of the lower portion 26 and can freely about the axis 2a. The lamp 29 and the condenser lens 31 are mounted on the lower end of the arm 28, and the objective 32 is mounted at the same level on the arm 27. The arm 27 is formed with an opening 33 behind which there is located the upwardly inclined mirror 34, and the mirror 35 is mounted on the upper arm 24 at a corresponding angle of inclination, in such a manner that the two mirror surfaces of the mirrors 34 and 35 confront one another, in the manner in which this is known from periscopes. The position of the mirror 35 is so selected that an extension of the exis 25 passes through the center of the mirror 35, as it passes also through the center of the screen 4 as mentioned previously.

The portions 22 and 26 of the frame are so connected that they can shift relative to one another, for example by means of a telescopic guide. This is diagrammatically illustrated by the sleeve 46 and the rollers 45 in the drawing. The displacement takes place in the direction of the light beam that travels from the mirror 34 to the mirror 35. In addition, the portion 26 is guided on a fixed straight line guiderail 37 via a guide roller 36 that engages the rail 37 and is mounted on either the arm 27 or 28. Due to the relative telescopic movement of the two portions 22 and 26, and the straight line guidance via the roller 36 and the rail 37, the lower portion 26 with the components of the reproducing system that are mounted thereon, is forced to move in a straight line when the frame turns about the axis 25.

In operation, the light issuing from the lamp 29 is formed into a beam in the condenser 31 and directed onto a small portion of the dial 1. An image of this illuminated portion of the dial 1 is then projected via the objective 32 and the mirrors 34 and 35 onto the screen 4. This arrangement assures that during a turning of the frame 22, 26 relative to the scale 1 an essentially constant travel path for the light from the scale 1 to the screen 4 is obtained.

It will be appreciated that the frame 22, 26 turns in dependence upon the desired base price. Each base price corresponds to a certain angular position of the frame which is set to the associated price scale 3 of the dial 1, so that during weighing and the thereby resulting pivoting of the dial 1 about the axis 2a the appropriate price is directly projected onto the screen 4. The frame 22, 26 is normally urged to a starting position; in the illustrated embodiment this is done by a spring 41 which holds it in abutment with a stop 42. In this starting position that dial 3 is projected which corresponds to the lowest base price. A cord linkage 43 and a disc 44 which can be set to the other base prices permit the other scales 3 to be moved into the path of travel of the light beam between the condenser lens 31 and the mirror 34.

The starting values and the end values of the price scales 3, which are all configurated as concentric circles having the pivot axis 2a as their center, are always located on a straight line 38, 39; these straight lines intersect in the pivot axis 2a. The guide rail 37 is so arranged that the light beam travels intermediate the condenser lens 31 and the mirror 34 along a straight path (during the setting of the frame 22, 26 to a selected base price) which in the zero position of the dial 1 extends parallel to the straight line 38. This means that when the frame 22, 26 is turned to a different angular position, the price indication is switched from one scale 3 to another, and in each case that portion of the selected scale will be eliminated and projected onto the screen 4 which corresponds to the weight that has been placed onto the weight carrier of the apparatus.

It will be appreciated that it is a particular advantage of the novel arrangement according to the present invention that corresponding subdivisions of the several scales 3 are not located on arcuate lines as in the prior art, but on straight lines, such as the straight lines 38, 39. Clearly, intermediate the end prices (i.e. the highest and the lowest price of each scale 3) which are located on the straight lines 38, 39, the corresponding subdivisions in all scales 3 are also located on straight lines. Given the large number of price scales required, and the small size of the dial 1, such an arrangement is substantially simpler than what is known from the prior art, and less expensive to produce.

The light path travelled by the light from the condenser lens 1 to the mirror 34 varies very slightly by an amount of only a few millimeters during turning of the frame 22, 26, due to the relative movement of the mirrors 34 and 35. However, these slight changes can be readily accepted since they are of an extremely minor nature and do not cause any difficulties in actual use.

It will be understood that each of the elements described above, or two or more together, may also find a useful application in other types of constructions differing from the types described above.

While the invention has been illustrated and described as embodied in a price-indicating scale, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a price-indicating scale, a combination comprising a frame having a first portion turnable about a turning axis, and a second portion mounted for straight-line movement; and an optical price-indicating system, comprising a translucent dial having a plurality of price scales and movable in dependence upon a weight on the scale, an objective at one and a light-source at the other side of said dial, said objective being mounted on said second portion of said frame and having an optical axis parallel to said turning axis, a stationary projecting screen, and a pair of mirrors respectively mounted on said first and second portions for directing a light beam from said objective onto said screen, said mirrors being telescopically shiftable relative to one another in the direction in which said light beam travels from one to the other of said mirrors, one of said mirrors being mounted on said optical axis and the other mirror being mounted on said turning axis.

2. A combination as defined in claim 1; further comprising a guide rail mounting said second portion for said straight-line movement thereof.

3. A combination as defined in claim 1; and further comprising connecting means connecting said portions for turning movement in unison about said turning axis.

4. A combination as defined in claim 1, wherein all price values which are associated in the respective scales with a certain weight are located on a common straight line intersecting all of said scales.

5. A combination as defined in claim 4, wherein said dial is pivotable about a pivot axis.

6. A combination as defined in claim 5, wherein said scales are located on concentric axis having said pivot axis as a center.

7. A combination as defined in claim 6, wherein said objective and the optical axis thereof are movable along a straight line which intersects said center, when said frame turns about said turning axis.

* * * * *